Nov. 12, 1968   B. J. LERNER   3,410,057
METHOD FOR GAS-LIQUID DISENTRAINMENT OPERATIONS
Filed Sept. 28, 1966   5 Sheets-Sheet 1

INVENTOR.
BERNARD J. LERNER
BY
ATTORNEY

Nov. 12, 1968 B. J. LERNER 3,410,057
METHOD FOR GAS-LIQUID DISENTRAINMENT OPERATIONS
Filed Sept. 28, 1966 5 Sheets-Sheet 2
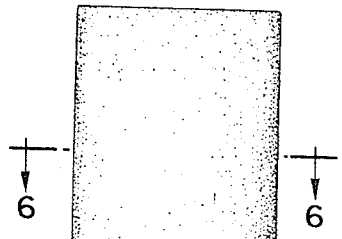
_Fig.5_
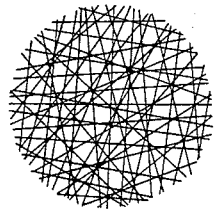
_Fig.6_
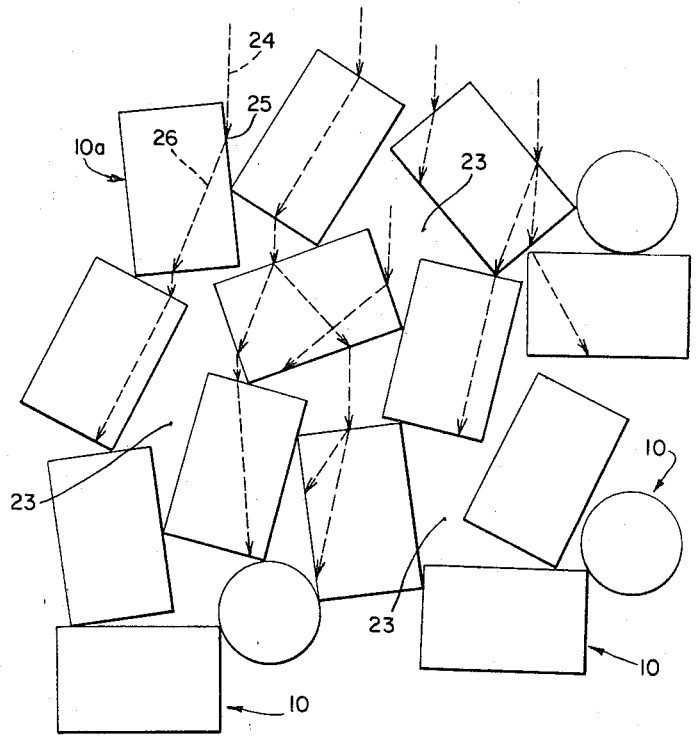
_Fig.9_
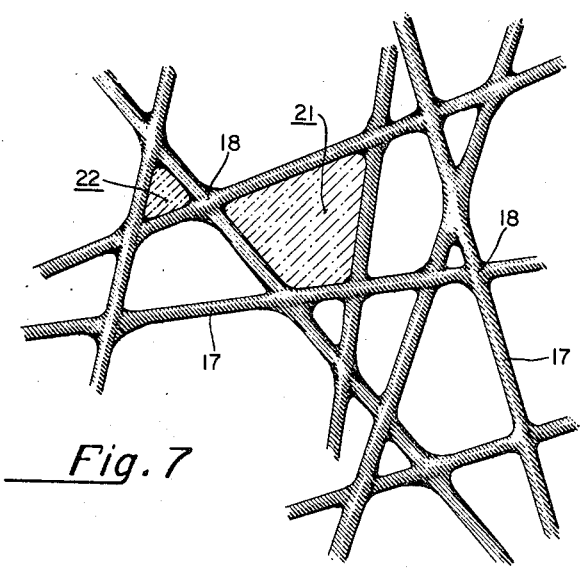
_Fig.7_
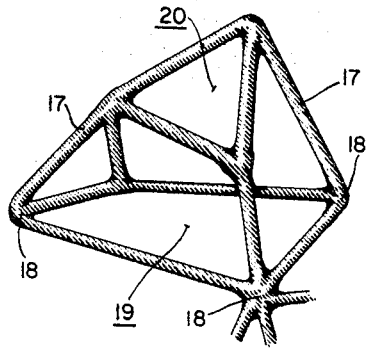
_Fig.8_
INVENTOR.
BERNARD J. LERNER
BY
ATTORNEY Nov. 12, 1968    B. J. LERNER    3,410,057
METHOD FOR GAS-LIQUID DISENTRAINMENT OPERATIONS
Filed Sept. 28, 1966    5 Sheets-Sheet 3
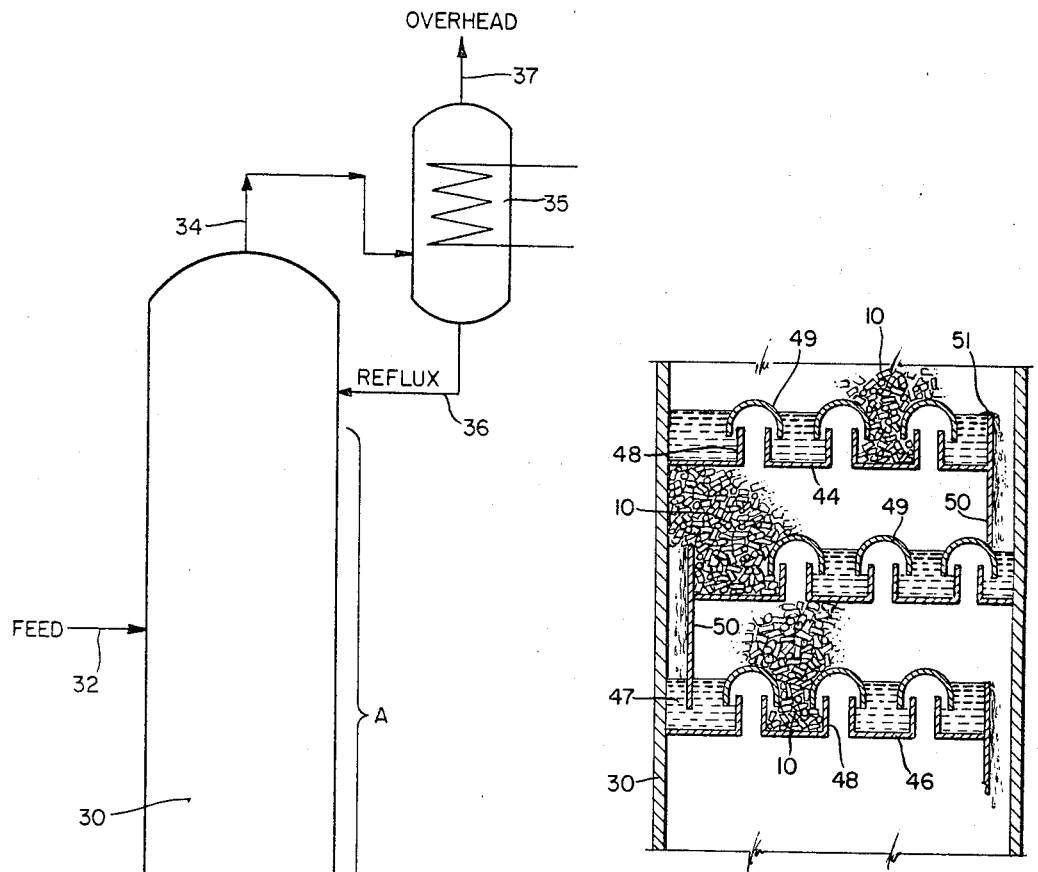
*Fig. 11*
*Fig. 10*
INVENTOR.
BERNARD J. LERNER
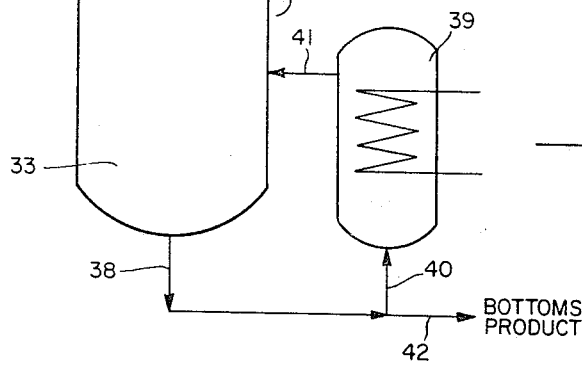
ATTORNEY.

United States Patent Office 3,410,057
Patented Nov. 12, 1968

3,410,057
METHOD FOR GAS-LIQUID DISENTRAINMENT OPERATIONS
Bernard J. Lerner, 727 Orchard Hill Drive, Pittsburgh, Pa. 15238
Continuation-in-part of application Ser. No. 336,802, Jan. 9, 1964. This application Sept. 28, 1966, Ser. No. 592,956
5 Claims. (Cl. 55—97)

ABSTRACT OF THE DISCLOSURE

This invention relates to the use of a new packing having high efficiency for gas-liquid disentrainment operations, i.e., the removal of entrained liquid droplets from a moving gas stream. The new packing comprises randomly disposed, porous but noncapillary discrete bodies of relatively small size made up of interconecting cells of varying size formed by a 3-dimensional network of interconnected strands and communicating with one another through pores of varying size, the average pore size being controlled within the limits of from about 5 to 50 pores per lineal inch. A prime advantage of the new packing over prior disentrainment packings is its high resistance to flooding at high liquid loadings.

---

Figure 1:
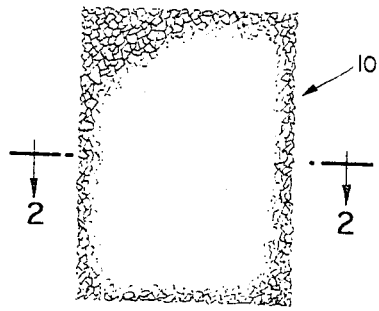

This applications is a continuation-in-part of my co-pending application, Ser. No. 336,802, filed Jan. 9, 1964, for Packing Element for Gas-Liquid Contacting Operations, now abandoned.

A wide variety of packing materials is employed for improving the efficiency of disentrainment between gas and liquid in connection with operations such as distillation, gas scrubbing operations where a gas or vapor component is absorbed by a liquid absorbent, or stripping operations where a gas or vapor is stripped out of a liquid by a stripping gas. One of the most common types of packing for such use consists of small shapes such as Raschig rings, Berl saddles, and the like which are dumped into the gas-liquid disentrainment space in random fashion to provide a large solid surface impingement area for the drops in the carrier stream passing through the voids between the individual packing pieces. Such solid shapes have the disadvantage that the bed of packing is relatively heavy, requiring relatively strong structural supports. Such packings also have the disadvantage that they have relatively high flow resistance and are prone to flooding at moderate or even relatively low rates of gas and liquid flow (flooding being the point at which the gas phase becomes discontinuous, the gas pressure drop becomes unstable and the bed tends to fill with liquid).

Many types of packings in the form of screens or woven or fibrous mats have also been suggested. This type of packing has the disadvantage that the screens or mats must be specially installed, often by tedious procedures, in contrast to the particulate form of packing which may be dumped at random to form a bed as in the case of Raschig rings, Berl saddles or the like. Fibrous mats or pads used as disentrainment devices are normally operated with a layer of liquid at the bottom of the pad, with the gas bubbling up through the liquid layer. ("Flooding" in the case of a pad disentrainer refers to the reentrainment of liquid from this standing liquid layer. Such liquid layer thickens with an increase in gas rate.) Because the liquid cannot be easily discharged from the bottom layers of the pad against the frictional resistance of the upflowing gas, particularly in the case of higher gas velocities and/or liquid entrainment loads, the major portion of liquid discharge frequently takes place down the walls of the vessel. Further, it is common practice to enlarge the diameter of the vessel at the point where a pad disentrainer is placed so that the gas velocity is reduced, and a wall-directed component of gas thrust is created to facilitate liquid discharge down the wall. Because a pad is normally operated with a standing liquid layer, and a discontinuous, bubbling gas flow, it is limited with respect to capacity for high liquid entrainment loads and high gas velocities.

Another type of packing proposed in the past for gas-liquid contacting consists of small hollow shapes, such as hollow cylinders, made of fine-mesh screen wherein liquid filming takes place on the surfaces of the screen to provide a high gas-liquid interface for mass transfer. With such packing, the liquid flows on the surfaces of the screen in roughly the same way that liquid flows on the surfaces of conventional packings with impervious solid surfaces, and they are accordingly subject to much the same disadvantages.

In accordance with the present invention, a new type of packing has now been found providing a unique combination of advantages for gas-liquid disentrainment operations. It is designed to be randomly dumped into the bed space with no necessity for stacking the packing elements. It is very light in weight, and can be made from low-cost materials. It is characterized by very high free volume (i.e., high pore volume within the packing itself) and very low pressure drops even at high rates of gas and liquid flow. It is highly resistant to flooding at high gas and liquid rates, and thus can be used under conditions in which the gas and/or liquid entrainment load varies over wide ranges.

The new packing of the invention comprises a bed of small, regularly shaped, porous but noncapillary bodies made up of a multitude of irregularly shaped, open cells of varying size formed by a multitude of interconnected strands, such cells communicating with one another through irregularly shaped pores of varying size, the average pore size being controlled within the limits of from about 5 to 50, and preferably 10 to 40, pores per lineal inch to insure noncapillary, i.e., nonflooding behavior. The cross-sectional thickness of the porous bodies making up the packing of the invention is large relative to average pore diameter. The porous bodies should be sufficiently rigid to resist substantial deformation under the load imposed on them during operating conditions and so shaped that, when dumped into a contact tower in random arrangement, a relatively large void volume between the individual bodies will result, as distinguished from a close-packed arrangement with little or no void volume between the individual bodies. To this end, the individual bodies are shaped so as to insure mostly point and line contact, rather than planar contact between the bodies, when dumped randomly in a contact tower, to form a packed bed.

In gas-liquid disentrainment applications, the extreme resistance of the packing of the invention to flooding even at high liquid loadings gives it outstanding advantages over prior disentrainment devices. The packing of the invention possesses this flood-resistant property by reason of a unique and distinctive liquid channelling behavior not exhibited by a pad or any other disentrainment device. That is, such a bed returns the disentrained liquid through flow channels established entirely within the confines of the porous bodies themselves, leaving free for gas flow the interstitial voids between the porous bodies as well as those portions of the porous bodies not utilized by the flowing liquid discharge.

Figure 2:
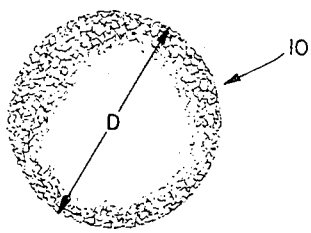
Figure 4:
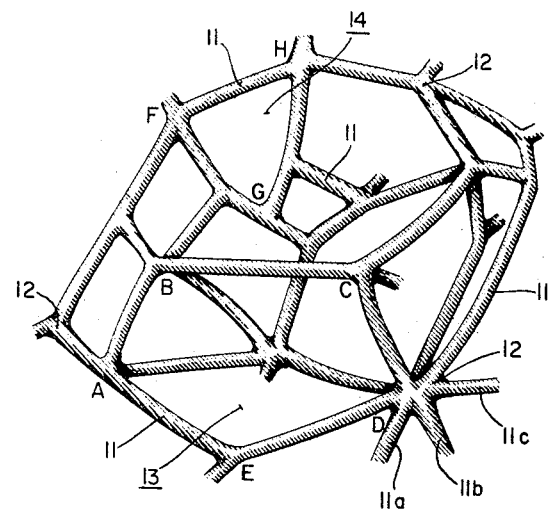
Figure 3:
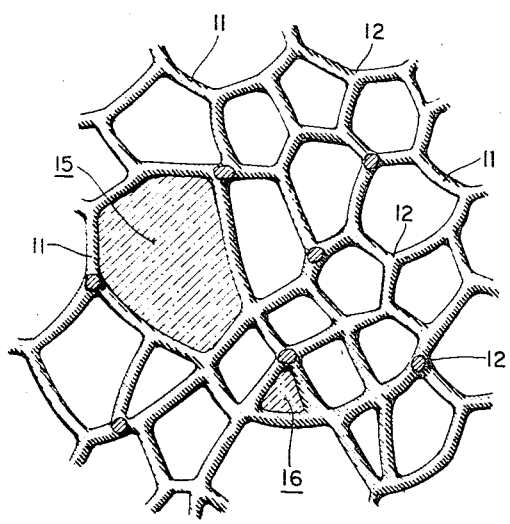
Figure 13:
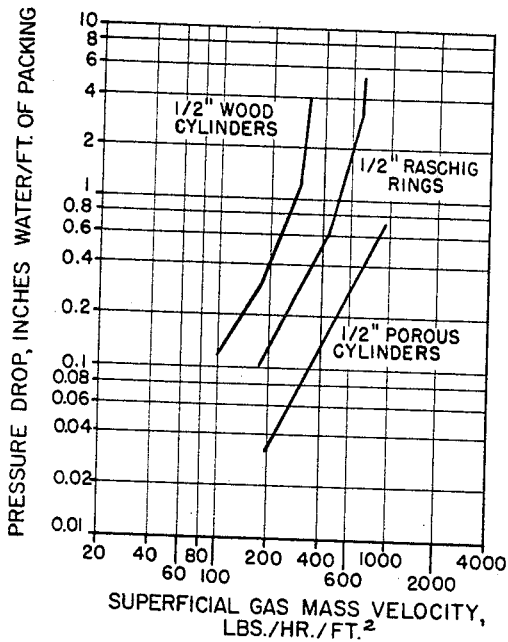
Figure 14:
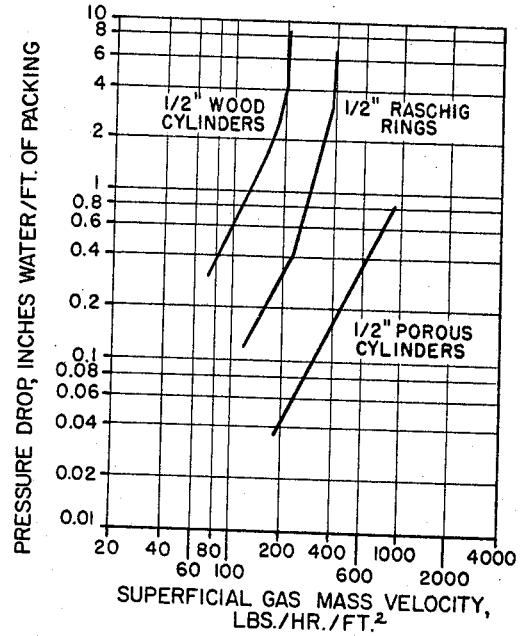
Figure 12:
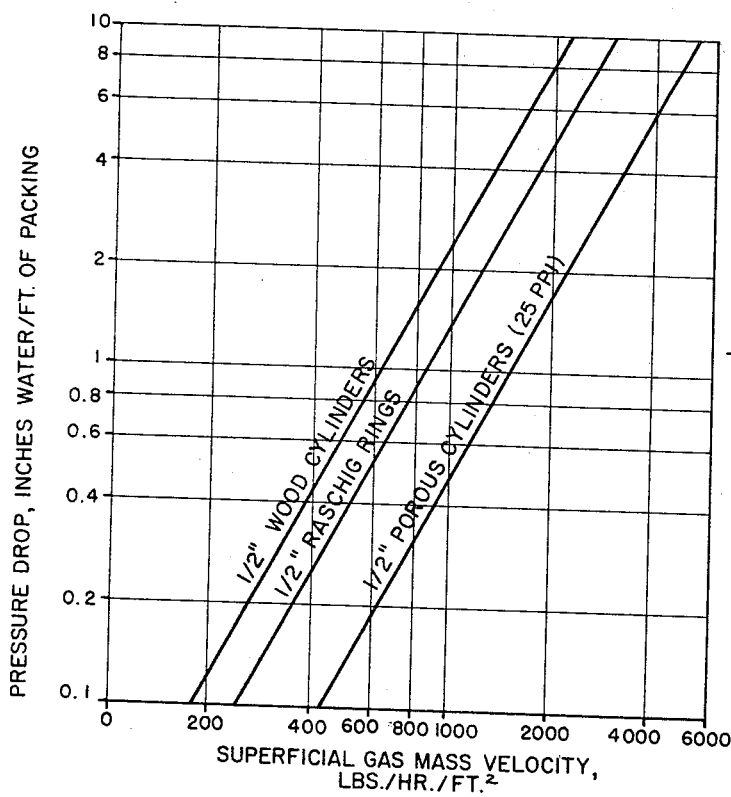
Figure 15:
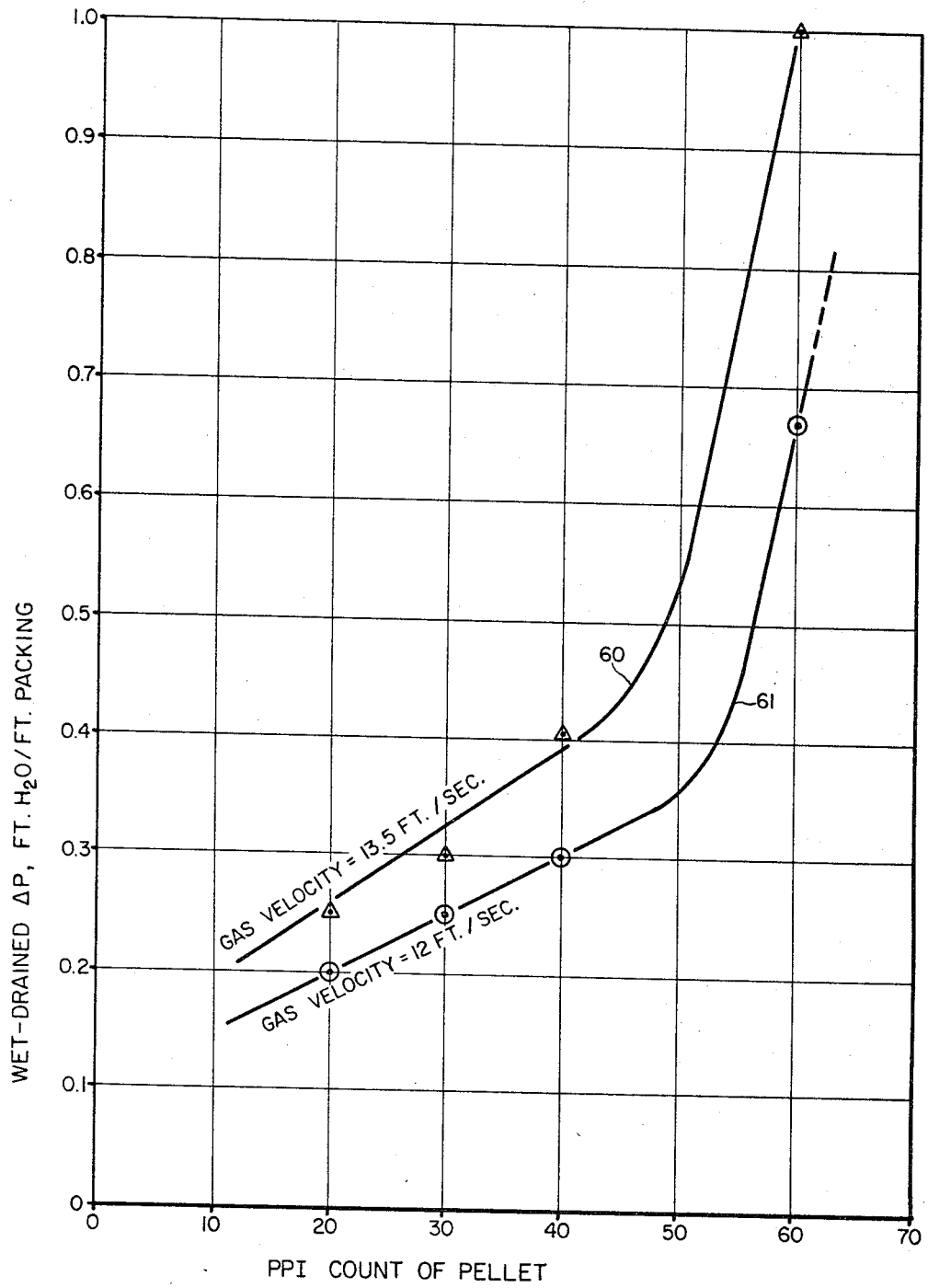

For a better understanding of the invention, reference is now made to the accompanying drawings wherein FIG. 1 is a side elevation of one embodiment of an individual body making up the new packing of the invention; and FIG. 2 is a cross-sectional view taken on the line 2—2 of FIG. 1; and FIG. 3 is an enlarged view of a portion of FIG. 2 showing the details of the pore structure of the packing body; and FIG. 4 is an isometric view showing in enlarged, semi-idealized form a typical cell of which the packing body of FIGS. 1 and 2 is composed; and FIG. 5 is a side elevation of a second embodiment of a body making up the new packing of the invention; and FIG. 6 is a cross-sectional view taken on the line 6—6 of FIG. 5; and FIG. 7 is an enlarged view of a portion of FIG. 6 showing the details of the port structure; and FIG. 8 is an enlarged, isometric, semi-idealized illustration of one of the cells making up the packing body of FIGS. 5 and 6; and FIG. 9 is a view showing a portion of a packed bed made up of packing bodies of the invention, illustrating the type of gas and liquid flow occurring in the bed; and FIG. 10 is a view showing a typical application of the new packing of the invention, i.e., to provide a disentrainment packing in a tray-type distillation tower to prevent liquid spray carry-over from one plate to another; and FIG. 11 is a vertical cross-sectional view of a portion of the tower of FIG. 10 showing the tray construction and the manner in which the packing of the invention is used to provide spray disentrainment; and FIGS. 12, 13 and 14 are graphs showing the low gas pressure drop for the packing of the invention at zero liquid flow (FIG. 12), and at two rates of liquid flow (FIGS. 13 and 14); and FIG. 15 is a graph showing the critical effect of average pore size on the operation of the packing of the invention.

Referring now to FIGS. 1 to 4, the reference numeral 10 refers generally to a packing body in the form of a small porous cylinder which may be e.g., 1″ in diameter and 1½″ long. The cylinder 10 is made up of a multitude of irregularly shaped cells, one of which is shown in greatly enlarged, semi-idealized form in FIG. 4. Referring to FIG. 4, it may be seen that the cell is made up of a plurality of strands 11 which are interconnected with one another at points 12 to form a 3-dimensional network. As may be seen, the intersecting strands form a multitude of irregularly shaped pores through which the cells communicate with one another. For example, pore 13 is bounded by the strands which define the plane ABCDEA. Pore 14 is bounded by the strands defining plane FGHF.

In FIG. 4, only one cell is shown for clarity of illustration, but it is understood that the multitude of individual open cells making up the packing body are each connected to other cells by strands such as strands 11a, 11b, and 11c which radiate from the various points of intersection of the strands to form additional pores making up additional cells. The structure thus formed is accordingly completely open and pervious to fluid flow in all directions and characterized by a high free volume. The free volume (i.e., the total volume of the element less that occupied by the interconnected strands) will be at least 80%, and preferably at least 90%, and will often be of the order of 95% to 99%.

In the packing body of the invention, it is important that the individual pores vary substantially in size. This feature is illustrated in FIG. 3 showing a greatly enlarged view of a portion of the cross-section shown in FIG. 2, where the pore size variation may be seen. As seen in that figure, the strands 11 intersecting at points 12 form a wide range of pore sizes, ranging from relatively large pores as indicated by the shaded area designated 15, to small pores as indicated by the shaded area 16. The variation in pore size is preferably such that the larger pores are at least about five times the cross-sectional area of the smallest pores. The relatively wide variation in pore size characteristic of the bodies making up the packing of the invention is of critical importance for the following reasons. Where there is a substantial variation in pore size, liquid return produced by coalesced liquid droplets will tend to flow along paths where the fiber density is highest, corresponding to the smaller pore sizes. This is a dynamic property, because if the liquid flow is stopped, the channels through which liquid is preferentially flowing will rapidly drain, with little or no liquid being retained by static capillary forces in the pores. This preferential flow through the maximum fiber density paths within the pellet (corresponding to the sites where the small pores are concentrated) may be termed "dynamic conductivity." An appreciable pore size variation confers the very necessary property of flexibility in dynamic conductivity. Thus, at low liquid entrainment rates, where liquid flow through the packing is correspondingly low, the smaller pores will be the principal conductors of liquid in the form of numerous random, tortuous, small-volume liquid streams flowing through the 3-dimensional packing and bed structure. At such liquid flow levels, the fractional internal volume of each porous body remaining open and available for gas flow and disentrainment function is quite large.

As the liquid load increases, the flow channels either enlarge to occupy the next lower density fiber paths adjacent to the establish liquid discharge streams (corresponding to sites where somewhat larger pores are located), or new streams are formed. The dynamic conductivity of the individual porous bodies and the bed itself thus changes to accommodate the additional liquid load by reason of the pore size variation. The gas flow is still continuous, and the filtering or disentrainment action of the porous bodies still not occupied by liquid flow is enhanced because the actual gas velocity in the free voids increases and the droplet impingement velocity goes up.

Ultimately, the liquid load may be increased to the point where the lowest fiber density volumes of the pellet (corresponding to sites where the largest pores are located) will be called into play to carry the flowing liquid. However, even at this point, where the individual bodies may be fully occupied by dynamic liquid flow, the interstitial voids between the pellets (where the fiber density is zero) still serve to carry the gas stream, and the bed does not flood.

Another advantageous result of the pore size variation is the easier discharge of liquid from the bed of porous bodies than from a pad. The pore size variation causes the returning liquid to form streams whose cross-section of flow is considerably less than that of the vessel containing the bed, as opposed to the nature of flow in a pad or bed of uniform pore size material wherein the liquid-return flow area would occupy the whole of the fibrous material. Thus, at equal liquid entrainment loadings, the bed of nonuniform porous bodies would have a higher equilibrium hydrostatic liquid head in the liquid flow channels than would a uniform porous material, thus allowing liquid discharge against higher frictional gas resistances.

In addition to substantial pore size variation, the average size of the pores is also of critical importance for insuring that the porous bodies will be noncapillary and thus nonflooding in nature. For most common liquid systems, an average pore size varying between a maximum pore size providing an average of about 5 pores per lineal inch to a minimum pore size providing an average of about 50 pores per lineal inch, will result in noncapillary, i.e., nonflooding, operation of the porous body. The preferred limits of average pore size for most common liquid systems are from 10 to 40 pores per lineal inch. The term "pores per lineal inch" means the average number of pores encountered in any cross-section of the porous body per lineal inch in a straight line in one plane.

With porous bodies having a substantial variation in pore size and an average pore size controlled within the limits specified above, it has been found that a bed of packing made up of such bodies has a very high resistance to flooding due to the fact that the porous bodies remain open and permeable both to gas and liquid flow as contrasted to a condition where liquid progressively accumulates within the porous body and is held there in a static condition by capillary action causing the voids within the body to flood. In this latter condition, the liquid within the body is essentially quiescent and gas flow through the body is blocked. In the noncapillary, nonflooding bodies of the invention, dynamic liquid flow occurs through the cross-section of the porous body in a series of irregular streams or rivulets as explained above.

The criticality of average pore size with respect to obtaining the desired noncapillary, nonflooding characteristics has been demonstrated by a series of tests which will be described hereinafter.

It is to be particularly noted that the pore structure of the packing body of the invention is 3-dimensional rather than 2-dimensional in nature in contrast to prior packings consisting of hollow shapes made up of thin screen elements. As is apparent from the drawings, the cross-sectional thickness of the bodies of the invention (the cross-sectional thickness of the cylindrical body 10 of FIGS. 1 to 4 being its diameter D) is large relative to the average pore diameter, being preferably at least 5 times as great.

While the 3-dimensional network making up the packing body need not be absolutely rigid (i.e., capable of resisting deformation by compressive forces), it should at least have sufficient rigidity to be substantially self-supporting under conditions of use. This is, the packing bodies should not deform substantially under conditions of use so as to eliminate voids between the individual bodies.

While the method by which the packing body shown in FIGS. 1 to 4 may be prepared forms no essential part of the present invention, one convenient and economical method for producing such a structure is by the foam-blowing of plastics, metals and ceramics in such manner as to form an open-celled structure entirely pervious to fluid flow. Thus, open-celled polyurethane foams or other open-celled plastic, metal or ceramic foams may be employed. The foams may be initially formed into the individual packing bodies, or the foam may be prepared in bulk and then cut into the desired packing bodies of the desired size. If the foam, as originally produced, is not sufficiently rigid in character, it may be rigidified by providing a thin coating of a rigidifying material such as a rigid plastic coating, e.g., of a phenol formaldehyde resin or an epoxy resin. In such a coating operation, care must be taken not to close the pores so as to leave the rigidified structure completely permeable to fluid flow.

FIGS. 5 to 8, inclusive, illustrate a packing body having a similar 3-dimensional structure of interconnected open cells communicating with one another through a multitude of pores wherein the structure is obtained by a random interlacing of fibrous material such as metal fibers, glass fibers, plastic fibers, or the like, the points of intersection of the fibers being bonded to one another, while leaving the spaces between the fibers open so as to provide the random pore structure desired. A typical open cell formed by this type of construction is shown in FIG. 8 wherein reference numeral 17 indicates the individual fiber strands bounded at their points of intersection 18 to form an open cell communicating with adjacent cells through pores such as pores 19 and 20. Referring to FIG. 7 showing an enlargement of the cross section of FIG. 6, it may be seen that the pores are irregular in shape and vary in size over a relatively wide range, including relatively large pores indicated by 21 to small pores indicated by 22. While the packing body of FIGS. 5 to 8 may be made by any desired method, one suitable procedure is to make up a randomly felted mat of fibers which is then treated to bond the fibers at their points of intersection such as by impregnation with a resin (taking care not to block the pores interconnecting the cells) to form a suitably rigid structure which may then be cut (e.g., by die-punching) into regular small shapes such as cylinders or pellets of polygonal cross-section. In the case of a metal fibrous material, such as steel fibers, the contact points may be fused by passing an electric current through.

The packing body should be small in size compared with the operating volume to be filled therewith. For the majority of applications, the average dimensions will range from about ⅜" to 4", and more usually from about ½" to 3". As previously stated, its overall size and shape should be such as to provide, when the bodies are dumped into a contact tower in random arrangement, a relatively large void volume between the individual bodies in contrast to a tightly packed arrangement affording little or no void volume. Preferably the inter-body void volume should be at least 15% of the total volume occupied by the bed of bodies in random arrangement and may range up to about 85%. To this end, the shape and size of the individual bodies is such that when randomly dumped to form a bed, there is predominantly point-to-point, or line-to-line contact between the bodies rather than planar contact. Preferred shapes for the packing bodies making up the packing of the invention are cylindrical shapes such as shown in the drawings, thick-walled hollow cylinders, spheres, pellets of polygonal cross-section, or the like. The contact bodies are likewise preferably so shaped that the dimensions along any given axis do not vary greatly. Preferably, the longest dimension is not greater than 3 times the shortest dimension, and most desirably, not more than twice.

Reference is now made to FIG. 9 which shows a portion of a bed of packing bodies of the invention in the form of porous cylinders 10 having a length slightly greater than their diameter. When such shapes are dumped at random in a contact tower to form a bed of packing, a relatively large volume of voids 23 results between the individual packing bodies. With this arrangement, gas flow may occur through the inter-body voids 23 around the external surfaces of the packing bodies 10, and in addition, gas flow may also occur through the interior of the packing bodies themselves, by passing through the relatively large pores not occupied by liquid streams.

A further desirable characteristic of the packing bodies of the invention in contrast to the use of fibrous packing in the form of sheets or wads, is the manner in which the multitude of external surfaces provided by the small individual packing bodies tends to deflect or refract liquid flow to provide a zigzag liquid flow pattern and to distribute returning liquid streams uniformly over the cross-sectional area of the bed. This deflecting or refracting action of the contact elements is illustrated in FIG. 9 wherein the arrows indicate direction of liquid flow. For example, a stream of liquid indicated by the arrow 24, on encountering the slightly inclined surface of packing body 10a at point 25, is deflected or refracted along line 26 rather than continuing in a straight-line direction of flow. The random packing arrangement shown with a multitude of surfaces at random inclination to one another, separated by inter-body voids, is required in order to obtain this effect.

As previously indicated, a highly advantageous feature of the packing elements of the invention is their low resistance to gas and liquid flow as indicated by low gas pressure drops and their high resistance to flooding even at high gas and liquid rates. Comparative pressure drop measurements were made for beds packed with ½" ceramic Raschig rings, ½" x ½" solid wooden cylinders, and ½" x ½" cylinders of open-pore polyurethane foam having a 3-dimensional network of interconnected strands forming a multitude of cells communicating with one another through open pores as illustrated in FIGS. 1 to 4. The average pore size was such that the material averaged 25 pores per lineal inch. The pore size ranged from a maximum of about 0.1 inch for the large pores to a minimum of about 0.01 inch for the small pores. These three materials were tested in a packed bed 3" in diameter and 24" deep. The bed was formed in each case by dumping the cylinders or Raschig rings into the contact tower in random arrangement. Liquid was delivered into the top of the bed by a spray head which distributed the liquid over the packing. Air was passed into the bed flowing upwardly countercurrent to the liquid. Air pressure drop measurements were made at various liquid flow rates. The results of these tests are shown graphically in FIGS. 12, 13, and 14.

FIG. 12 shows the pressure drops obtained with no liquid flow (packings in dry condition) illustrating the considerably lower pressure drop for the packing elements of the invention.

FIG. 13 shows the pressure drops obtained for the three types of packing at a liquid flow rate of $L_0 = 1500$ pounds per hour per square foot of packing at varying gas velocities. As may be seen, the pressure drop for the packing of the invention is not only very substantially lower than the pressure drops for other types of packing, but it will also be noted that the rate of increase of pressure drop is constant over a wide range of gas velocities. Thus, the wood cylinders and Raschig rings show a steep rise in the pressure drop at gas velocities of the order of 300 to 450 pounds per hour per square foot, indicating the onset of flooding conditions whereas the packing of the invention shows no such sharp increase of pressure drop even at gas velocities up to 1000 pounds per hour per square foot, thus indicating a high resistance to flooding for the packing of the invention.

FIG. 14 shows the results obtained for the three types of packing at a liquid rate of 5000 pounds per hour per square foot of packing at various gas rates. Here again, the same relative behavior is to be noted. The wood cylinders and Raschig rings show a steep rise in pressure drop at gas velocities between 200 and 400 pounds per hour per square foot, indicating the onset of flooding, whereas the packing of the invention shows no tendency to produce a steep rise in pressure drop at much higher gas velocities, again indicating a strong resistance to flooding.

As stated previously, the average pore size of the bodies making up the packing of the invention is a critical factor governing its flooding resistance and thus its operability as a noncapillary, nonflooding disentrainment medium. In a first series of tests to show the effect of average pore size on the flooding resistance of the packing of the invention, porous packing bodies were employed having 20, 30, 40 and 60 p.p.l.i. (pores per lineal inch), respectively, having a structure as shown in FIGS. 1 to 4. The packing bodies were placed in a six-inch diameter column between retaining screens to provide a bed about twelve inches in depth. These beds, in each case, were first loaded with water by passing an air stream containing entrained water droplets upwardly through the bed. The bed was then allowed to drain by gravity for five minutes. Thereafter, an air stream was passed upwardly through the bed at a superficial velocity of 12 feet per second in one series of runs, and at a superficial velocity of 13.5 feet per second in a second series of runs. The pressure drop ($\Delta P$) in feet of water per foot of packing depth was measured for each pore size, and the results are shown graphically in FIG. 15 where Curve 60 shows the results at 13.5 feet per second, and Curve 61 shows the results at 12 feet per second.

As can be seen in FIG. 15, the pressure drop for the 20, 30 and 40 p.p.i. packings remained low although increasing somewhat with decreasing pore size (i.e., with increasing numbers of pores per lineal inch), but increased very sharply as the average pore size decreased to that corresponding to 60 p.p.i. The very sharp increase in bed resistance at the 60 p.p.i. level indicated that it was statically flooded through capillary action (high liquid hold-up in the bed following the five-minute drainage period) which was verified by visual observation. As shown by Curves 60 and 61 in FIG. 15, the average pore size (as measured in pores per lineal inch—p.p.i.) has a critical effect on the operability of the packing of the invention even under a static liquid load (i.e., loaded with liquid but no dynamic liquid flow) with an extremely sharp and unacceptable increase in the gas flow resistance beginning at about 50 p.p.i. average pore size.

The same critical effect of average p.p.i. on operability was also found in a second series of tests run under conditions of dynamic liquid flow. In this second series, a twelve-inch deep bed of the packing bodies was placed between retaining screens in a six-inch diameter column. Entrainment was generated by means of a splash plate (a perforated plate through which air was passed while a heavy jet of water was directed against a solid central target section of the plate). The bottom of the bed of packing bodies was positioned about 17 inches above the splash plate. Quantitative measurements of the liquid entrainment load in the air stream at various air velocities were made at the level of the bottom of the bed. With this arrangement, the disentrainment efficiency of porous packing bodies consisting of one-inch diameter cylinders constructed according to FIGS. 1 to 4 and having 30, 40 and 60 p.p.i. average pore size, respectively, was measured.

In runs with the 30 p.p.i. packing bodies, when the gas velocity and entrainment load were increased to a maximum superficial gas velocity of about 14 feet per second, giving a liquid entrainment load of over 300 lbs. per hour per square foot of bed cross-section, a measured disentrainment efficiency (i.e., percent of entrained liquid removed by the bed) of 99.9% was obtained at a stable, constant pressure drop of 4.50 inches of water over an extended period of time. Similar results were obtained with the bed consisting of 40 p.p.i. packing bodies although moderate amounts of entrainment breakthrough occurred after a period of operation at the maximum gas velocity of 14 feet per second corresponding to entrainment loads of about 300 lbs. per hour per square foot.

When attempts were made, however, to repeat this test with a bed of packing bodies of 60 p.p.i. average pore size, the bed flooded immediately and gave zero disentrainment efficiency at even the lowest liquid loadings. Attempts to increase the disentrainment efficiency and avoid flooding, using the 60 p.p.i. packing bodies, by changing pellet diameter to one-half inch and by reducing the depth of the pellet bed to 9 inches similarly failed. No disentrainment was achieved and the pressure drop through the bed built up to the point that the bed itself and the retaining screen holding the bed were blown out of the column.

In still further tests, the extraordinary capacity of the packings of the invention was demonstrated by placing a 6-inch deep bed of packing consisting of one-half inch diameter pellets about ¾ inch long, having the porous structure shown in FIGS. 1 to 4 and an average pore size of 30 pores per lineal inch, in a 6-inch diameter column directly on the splash plate described above so that the bed was subjected to the full intensity of the extremely high entrainment load generated at the splash plate. In these tests, when the gas velocity and corresponding entrainment load was gradually increased, the packing gave a measured efficiency of over 99.9% entrainment removal at all air velocities up to a gas velocity of 8 feet per second and an entrainment load of over 30,000 lbs. per hour per square foot of cross-section. There were no signs of any instability or entrainment leakage through the bed up to a velocity of 8 feet per second and an entrainment load of over 30,000 lbs. per hour per square foot. This value of entrainment load is vastly in excess of the maximum load that can be handled by any prior disentrainment media such as pads or other types of packages.

The choice of optimum average pore size for the bodies making up the packing of the invention within the limits of about 5 to 50, and preferabley 10 to 40, pores per lineal inch will usually be most easily accomplished by empirical methods. The larger pore sizes generally provide somewhat lower pressure drop while the smaller pore sizes are generally more effective in removing small-size, entrained liquid droplets. The choice of optimum pore size within the above range will generally be a balance between these two considerations. Sometimes it may be desirable to employ a bed having bodies of two or several different average pore sizes within the above range with the larger pore size packing in the bottom of the bed where the larger liquid droplets are removed, and the smaller pore size packing in the upper portion of the bed to effect removal of the smaller droplets. Such an arrangement tends to distribute the liquid disentrainment load more evenly throughout the bed while, at the same time, increasing the range of particle size of liquid droplets that are effectively removed by the bed.

The extremely high effectiveness of the packing of the invention for gas-liquid disentrainment, as illustrated in the foregoing examples, stems not only from the internal structure of the porous bodies themselves (pore size variation and average pore size range being critical factors as explained above), but also from the combination of this specific internal structure of the individual bodies and the inter-body voids (i.e., the voids 23 of FIG. 9). In contrast to demisting pads and the like substantially filling the cross-section of the tower, the packed bed of the invention permits deeper bed penetration of the gas-borne liquid droplets since they are able to pass up through the bed through the inter-body voids. Demisting pads on the other hand tend to remove the bulk of the entrained droplets in the first portion of the bed encountered, thus tending to cause liquid overloading (with accompanying high back pressure and erratic flow characteristics) of the inlet portion of the pad. Transmittance through the inter-body voids in accordance with the invention permits fuller utilization of the upper portions of the bed by more evenly distributing the entrainment trapping load throughout the bed. Since practically all back flow or drainage of liquid occurs through the porous bodies themselves (and very little through the inter-body voids), the tendency to overload with liquid is greatly reduced since the overall porosity of the bed (porosity of the bodies themselves plus inter-body voids) cannot drop below the minimum contributed by the inter-body voids. These voids accordingly even at high liquid loading tend to remain free to transmit gas flow.

A further advantage flowing from the combination of the porous bodies and the inter-body voids for disentrainment applications is the additional disentrainment mechanism that is brought into play. In porous-pad type demisters, there are two principal disentrainment mechanisms, viz. impingement disentrainment which removes the larger particles and diffusion which removes the smaller particles. To these the packed bed of the invention adds an eddying and swirling movement of the gases in the inter-body voids which tends to bring the entrained droplets into contact with the fibers of the packing bodies by centrifugal force.

Reference is now made to FIGS. 10 and 11 which show a typical application for the packing of the invention as a disentrainment packing between the plates of a bubble-cap distillation tower. The tower shown semi-diagramatically in FIG. 10 comprises a tower shell 30 having a section A equipped with bubble cap plates as shown in the partial vertical cross-section in FIG. 11.

Liquid feed is introduced into the tower through line 32 flowing downwardly countercurrent to vapors produced by the boil-up of the liquid 33 in the bottom of the column. Vapors are taken off at the top of the column by line 34, sent through reflux condenser 35 feeding reflux back into the column through line 36. Overhead products are taken off by line 37.

Liquid is withdrawn from the bottom of the column through line 38. A portion of the bottoms is recirculated through reboiler 39 by line 40 and reintroduced into the column through line 41 while a portion is taken off by line 42 as bottoms product.

Referring to FIG. 11, it may be seen that section A of tower 30 is equipped with a plurality of plates 44, 45, 46, etc., carrying layers of liquid 47. The plates are equipped with the usual risers 48 provided with caps 49 to force the gas to flow into the layer of liquid on the plates. Each plate is equipped with a usual downcomer 50. The upper edge 51 of the downcomers establishes the liquid level on the plates.

A limiting factor in bubble-cap columns is liquid droplet entrainment from one plate to another with attendant loss in plate efficiency and a decrease in overall separation. The packing of the invention provides an excellent entrainment trap when the space between the plates is filled with the packing bodies as illustrated in FIG. 11. (For clarity of illustration, only a portion of the space between the trays is shown as filled with the packing of the invention, while in the embodiment shown it is intended that substantially the entire space be so filled.)

As shown in FIG. 11, the packing material fills substantially the entire space between the plates including the space occupied by the liquid layer. This simplifies installation of the packing (since no special support is needed, the packing being supported directly on the surface of the plates). This arrangement has the further advantage that the presence of the porous packing bodies immersed in the liquid on the plates does not interfere with the desired interaction of the gas and liquid on the tray, but will tend to limit longitudinal mixing of the liquid on the plate. Such mixing, particularly on large plates, tends to reduce plate efficiency.

For the type of application illustrated in FIGS. 10 and 11, the lightweight nature of the packing of the invention and the fact that it is readily handled as small units is a great advantage. These properties permit it to be installed between the plates by such means as pneumatic conveyors for blowing the packing bodies into place rather than by hand installation as in the case of continuous-sheet demisting packs currently used. For this type of application, a bonded, non-woven, fibrous material or a foamed plastic material having an open-cell, permeable structure, such as open-cell foamed polyurethane, are particularly advantageous because of their very light weight. Such materials, having a pore volume of about 95% to 97% are extremely light in weight (of the order of one to two pounds per cubic foot in the dry condition) and thus could be installed in existing towers without entailing any modification of tower foundations or shell thickness because of increased weight.

In the type of application illustrated in FIGS. 10 and 11 where the porous bodies are employed as a packing between the plates of a gas-liquid contact tower with a substantial liquid layer on each plate, the packing permits a substantial decrease in plate spacing since in conventional plate towers the major portion of the volume of the column is purely entrained liquid droplet disengagement space. The type of application illustrated in FIGS. 10 and 11 is not limited to bubble-cap towers but may extend to any type of gas-liquid contact tower containing a plurality of superimposed plates carrying substantial liquid layers with means, such as perforations or slots in the plate, to permit gas to flow upwardly through the liquid layer while liquid flows downwardly through downcomers or any other suitable means to provide for liquid flow downward from plate to plate.

When used as a packing between plates as in FIGS. 10 and 11, it is not necessary that the packing fill the entire space between the plates although this will often be desirable. Thus, the packing may be supported above the liquid layer by a wide-mesh wire screen instead of occupying the space flooded by liquid as well as the space above the liquid. Not all of the space above the liquid need be occupied by the packing; but for effective operation, the packing should extend across the entire plate area so as to avoid by-passing.

The packing of the invention is highly useful in any type of gas-liquid disentrainment operation where the function of the bed is to disentrain liquid droplets carried by a moving gas stream such as a demisting bed in knock-out drums, a demister at the outlet of distillation towers, scrubbing towers or the like to disentrain liquid droplets carried in the gaseous effluent from such towers.

It is to be understood that the invention is not limited to the specific illustrative embodiments described and that many other modifications and embodiments within the general spirit of the invention are included within its scope.

I claim:

1. A method for disentraining liquid droplets from a moving gas stream comprising the step of passing the gas stream containing said liquid droplets through a packing made up of a plurality of porous, but noncapillary, bodies of relatively small size compared with the operating volume occupied by said packing, said bodies being randomly disposed in said operating volume, and so shaped as to provide in such random arrangement a relatively large void volume between said bodies, said bodies being made up of a multitude of irregularly shaped open cells of varying size formed by a multitude of interconnected strands producing a 3-dimensional network throughout said bodies substantially devoid of walls, said cells communicating with one another through irregularly shaped pores of varying size bounded by said interconnecting strands whereby said bodies are open to fluid flow through said 3-dimensional network of open, substantially wall-less cells in all directions, the average size of said pores being such as to provide an average of from about 5 to about 50 pores per lineal inch with substantial variation in size between the larger and smaller pores, the cross-sectional thickness of said bodies being large relative to the average size of said pores and the material forming said pores being sufficiently rigid to resist substantial deformation under the load imposed thereon under operating conditions.

2. A method in accordance with claim 1 in which the packing employed has an average pore size of from about 10 to about 40 pores per lineal inch.

3. In the operation of a gas-liquid contact device comprising a plurality of superimposed, horizontal plates carrying in operation liquid layers with a vapor space above said liquid layers with means permitting liquid to flow downwardly from plate to plate, and with means permitting gas to flow upwardly from plate to plate while passing through said liquid layers on said plates, whereby said gas stream entrains substantial quantities of liquid droplets and tends to carry this entrainment upwardly from plate to plate, the method for disentraining said liquid droplets from said gas stream which comprises providing the vapor space between said plates with a packing as defined in claim 1 extending across said vapor space in the path of gas traveling therethrough.

4. A method in accordance with claim 3 in which said packing is supported directly on said plates and substantially fills the entire space between said plates, including that occupied by said liquid layers.

5. A method in accordance with claim 3 in which said packing has an average pore size of from about 10 to about 40 pores per lineal inch.

References Cited

UNITED STATES PATENTS

| | | | |
|---|---|---|---|
| 1,654,925 | 1/1928 | Drager | 261—94 X |
| 2,095,460 | 10/1937 | Swords | 55—523 X |
| 2,921,776 | 1/1960 | Keeping | 261—94 |
| 2,961,710 | 11/1960 | Stark. | |
| 3,190,057 | 6/1965 | Sinex. | |
| 3,227,429 | 1/1966 | Renzi | 261—112 |
| 3,266,787 | 8/1966 | Eckert | 261—94 |
| 3,293,174 | 12/1966 | Robjohns | 261—98 X |

FOREIGN PATENTS

| | | |
|---|---|---|
| 171,772 | 11/1921 | Great Britain. |
| 858,127 | 1/1961 | Great Britain. |
| 931,853 | 6/1963 | Great Britain. |

OTHER REFERENCES

"Support Plates and Distributors for Packed Towers," The U.S. Stoneware Co., Akron, Ohio. Bulletin TA-30, copyright 1957, pp. 4 and 5 relied on.

HARRY B. THORNTON, *Primary Examiner.*

TIM R. MILES, *Assistant Examiner.*